Oct. 8, 1929.   W. E. POPE   1,731,173
FISHING ROD
Filed Dec. 20, 1927

INVENTOR
W. E. Pope
BY
ATTORNEY

Patented Oct. 8, 1929

1,731,173

UNITED STATES PATENT OFFICE

WILLIAM EDDIE POPE, OF WEST PALM BEACH, FLORIDA

FISHING ROD

Application filed December 20, 1927. Serial No. 241,343.

My invention relates to improvements in fishing rods, more particularly to rods of the extensible type.

An object of my invention is to provide a rod having a handle portion capable of adjustment to any desired length.

A further object is to provide an extensible fishing rod, which is inexpensive in construction and when retracted is conveniently carried.

Other objects and advantages will appear in the following specification, and the novel features of the invention will be particularly pointed out in the appended claims.

My invention is illustrated in the accompanying drawings forming a part of this application, in which:—

In carrying out my invention I provide a hollow cylindrical handle member 1. Slidable in the handle member 1 is the tapered body portion 2. One end of the body portion is bound with leather, forming a piston 3. The other end of the body portion 2 has the usual eyes 4 and 5, through which the line may be threaded.

Figure 1:
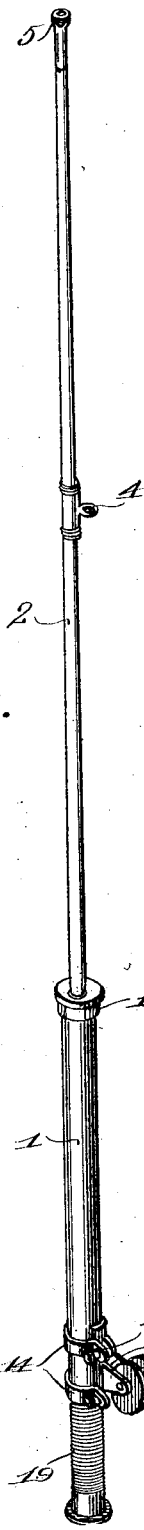
Figure 1 is a perspective view of the rod in the extended position.
Figure 2:
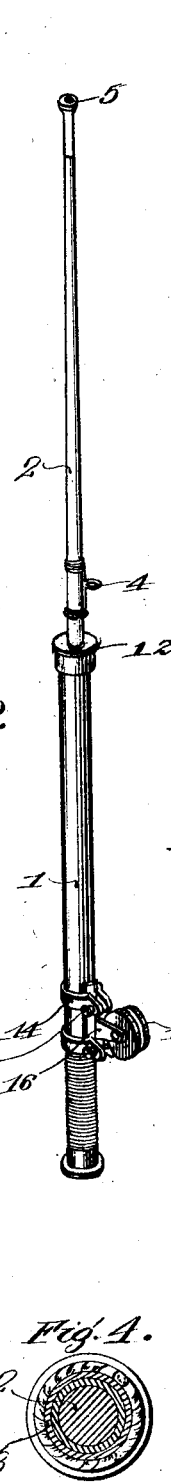
Figure 2 is a view of the rod in retracted position.
Figure 3:
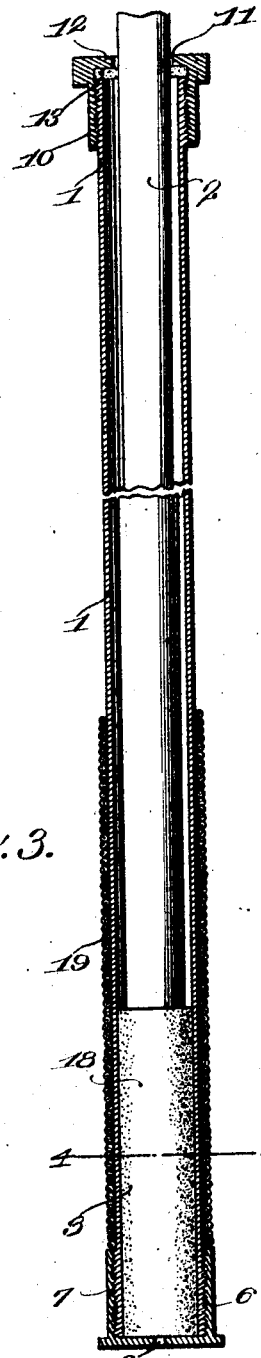
Figure 3 is an enlarged vertical sectional view of the handle portion.
Figure 4:
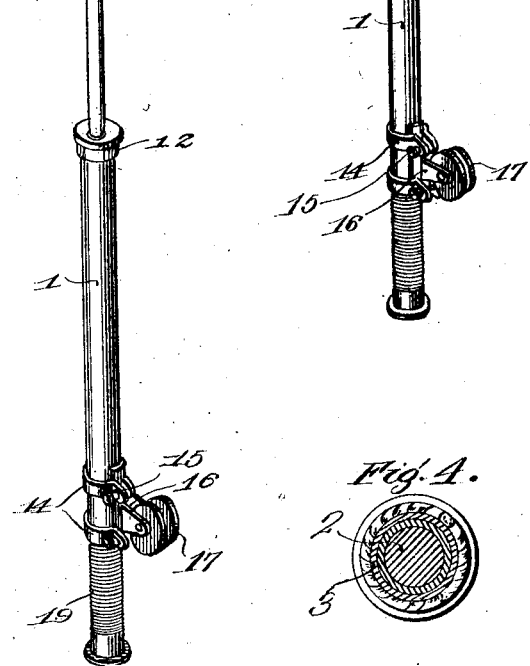
Figure 4 is a transverse sectional view taken on line 4—4 of Figure 3.

One end of handle member 1 is screw-threaded as at 6, for receiving a cap 7. The cap 7 has an opening 8 for the escape of air compressed in the handle. The other end of the handle member 1 is screw-threaded as at 9, for receiving a nut 10. The body portion 2 passes through the opening 11 in the nut. Clamped between the end of the handle member 1 and a shoulder 12 formed on the nut 10 is a leather or rubber ring 13. The ring 13 is pliable enough to retard the tapered body portion in its extended position 2 as shown in Figure 1, or in its retracted position as shown in Figure 2.

Clamped on the handle member 1 at any desired position, are straps 14 held in place by bolts 15. Fastened to the handle 1 by the straps 14, is a support 16 on which is mounted the usual reel 17.

The handle member 1 is wrapped as at 18 with cord or the like, 19 forming a hand grip. The piston 3 is so designed as to fit frictionally within the interior of the handle member 1.

From the foregoing description of the various parts of the device the operation thereof may be readily understood.

When the body portion of the rod is in its extended position, or in any position between the extended position and the retracted position, and the nut 12 is tightened, it will be observed that the body portion is held firmly by the contact of the piston with the walls of the handle member 1, and also at the end of the handle member 1 by the resilient ring 13. It is often desirable to have a collapsible rod of a length less than the maximum length, and this invention provides such a rod, and has means for firmly clamping the parts in any of their adjusted positions. The opening 8 in the cap 7 permits the escape of air or the entrance of air as the piston is moved.

I am aware of collapsible or telescopic fishing rods. These rods, however, have sections which are not held at two points, as in the present invention, in any of the extended positions, but must be fully extended before the sections are in position to be held rigidly. The provision of the piston 3 which forms a holding member, and of the clamping ring 13, which forms an auxiliary holding member, provides means whereby no matter how far the body portion may be extended, it may be securely clamped to the handle portion.

I claim:

1. An extensible fishing rod comprising a hollow cylindrical handle portion, a tapered body portion having one end formed into a piston adapted to frictionally engage the interior of the hollow handle, said body portion being adjustable with respect to the handle, a pliable gripping ring carried by said handle at one end thereof, and means for contracting said pliable ring whereby the tapered body portion may be gripped in any of its adjusted positions.

2. An extensible fishing rod comprising a hollow cylindrical handle, a tapered body portion having its larger end formed into a cylindrical piston arranged to frictionally engage the interior walls of the hollow handle portion, and being movable with respect thereto, a pliable gripping ring surrounding said body portion, and a nut carried by said handle portion adapted to engage said gripping ring, and to force it in gripping engagement with the tapered body portion in any position of the latter.

3. An extensible fishing rod comprising a hollow cylindrical handle member, a cap at one end of said handle member provided with a vent opening, a tapered body portion having its larger end formed into a cylindrical piston, said piston being arranged to frictionally engage the inner walls of the hollow handle, said body portion being adjustable with respect to the handle, said handle being threaded at one end, a compression ring surrounding said body portion, and a nut having an opening arranged to receive the body portion and being threaded to engage the threads on the handle, the movement of said nut causing the contraction of the ring to grip the tapered body portion in any of its adjusted positions.

Signed at West Palm Beach in the county of Palm Beach and State of Florida this 17th day of December, A. D. 1927.

WILLIAM EDDIE POPE.